(12) United States Patent
Gigler et al.

(10) Patent No.: US 12,517,985 B2
(45) Date of Patent: Jan. 6, 2026

(54) METHOD FOR RESTORING LICENSE KEYS IN A MODULAR AUTOMATION STATION, AUTOMATION STATION AND METHOD FOR OPERATING THE AUTOMATION STATION

(71) Applicant: Siemens Aktiengesellschaft, Munich (DE)

(72) Inventors: Alexander Michael Gigler, Untermeitingen (DE); Stefan Dausend, Eschenbach (DE); Daniel Thürauf, Neuhof/Zenn (DE)

(73) Assignee: Siemens Aktiengesellschaft, Munich (DE)

( * ) Notice: Subject to any disclaimer, the term of this patent is extended or adjusted under 35 U.S.C. 154(b) by 154 days.

(21) Appl. No.: 18/372,197

(22) Filed: Sep. 25, 2023

(65) Prior Publication Data

US 2024/0104172 A1 Mar. 28, 2024

(30) Foreign Application Priority Data

Sep. 26, 2022 (EP) ..................................... 22197744

(51) Int. Cl.
*G06F 21/10* (2013.01)
*G06F 13/40* (2006.01)

(52) U.S. Cl.
CPC ...... *G06F 21/1078* (2023.08); *G06F 13/4063* (2013.01); *G06F 21/107* (2023.08)

(58) Field of Classification Search
None
See application file for complete search history.

(56) References Cited

U.S. PATENT DOCUMENTS 5,758,068 A * 5/1998 Brandt ..................... G06F 21/10
726/30
6,772,340 B1 * 8/2004 Peinado .................. G06F 21/10
713/168
(Continued)

FOREIGN PATENT DOCUMENTS

DE 202011108152 1/2012
EP 1224510 B1 9/2003
(Continued)

OTHER PUBLICATIONS

Elaine Barker. "Recommendation for Key Management: Part 1". (May 2020). Retrieved online Apr. 23, 2025. https://nvlpubs.nist.gov/nistpubs/specialpublications/nist.sp.800-57pt1r5.pdf (Year: 2020).*
(Continued)

*Primary Examiner* — James A Reagan
(74) *Attorney, Agent, or Firm* — Cozen O'Connor

(57) ABSTRACT

Automation station and method for restoring license keys in a modular automation station which includes a main unit having a backplane bus connection and a plurality of modules having another backplane bus connection, wherein the plurality of modules or the main unit having a respective backplane bus connection communicate with one another via a backplane bus, where the plurality of modules are operated via a license key to provide software-based functionality tied to a respective license key after a module is replaced with a replacement module, and the license key is restored via automated reading of three data blocks, even when only two of the three data blocks are readable and the license key for the software-based functionality of the replaced module is assigned to the replacement module and thus the software-based functionality is enabled in the replacement module.

3 Claims, 7 Drawing Sheets

(56) References Cited

U.S. PATENT DOCUMENTS

| | | | | |
|---|---|---|---|---|
| 6,920,567 | B1* | 7/2005 | Doherty | G06F 21/10 713/168 |
| 7,484,103 | B2* | 1/2009 | Woo | G06F 21/10 713/193 |
| 7,930,558 | B2* | 4/2011 | Hori | G06Q 20/3552 713/193 |
| 8,650,055 | B2* | 2/2014 | Davie | G06Q 10/30 705/7.11 |
| 8,781,969 | B2* | 7/2014 | Khandelwal | G06F 21/10 705/51 |
| 9,003,141 | B2* | 4/2015 | Nielsen | G06F 11/20 718/1 |
| 10,860,305 | B1 | 12/2020 | Harland | H03K 19/177 |
| 11,151,225 | B2* | 10/2021 | Desai | G06F 21/572 |
| 11,847,226 | B1* | 12/2023 | Righi | G06F 21/572 |
| 11,856,723 | B2* | 12/2023 | Harvey | G06F 3/0482 |
| 2003/0074088 | A1* | 4/2003 | Gonzales | H04L 12/2829 700/20 |
| 2003/0084306 | A1* | 5/2003 | Abburi | G06F 21/109 713/188 |
| 2003/0126456 | A1* | 7/2003 | Birzer | G06F 21/105 713/193 |
| 2005/0289072 | A1* | 12/2005 | Sabharwal | G06F 21/121 705/59 |
| 2007/0162764 | A1* | 7/2007 | Hass | G06F 21/105 713/187 |
| 2007/0173961 | A1* | 7/2007 | Kumar | G05B 19/042 700/83 |
| 2008/0177598 | A1* | 7/2008 | Davie | G06Q 10/30 705/308 |
| 2009/0184839 | A1* | 7/2009 | Brown | H01H 13/70 340/4.31 |
| 2013/0124807 | A1* | 5/2013 | Nielsen | G06F 11/1482 711/E12.103 |
| 2013/0254447 | A1* | 9/2013 | Molnar | G06F 1/266 710/305 |
| 2014/0090051 | A1* | 3/2014 | Brundridge | G06F 21/14 726/17 |
| 2016/0073217 | A1* | 3/2016 | Schmedling | H04L 9/0897 726/29 |
| 2016/0180103 | A1* | 6/2016 | Fisher | G06F 21/6209 726/27 |
| 2016/0252895 | A1* | 9/2016 | Case | G05B 19/418 700/12 |
| 2016/0291565 | A1* | 10/2016 | Volevach | G05B 19/054 |
| 2017/0038754 | A1* | 2/2017 | Lo | G05B 19/05 |
| 2020/0117442 | A1* | 4/2020 | Robertson | G06F 11/2033 |
| 2021/0367838 | A1* | 11/2021 | Lundy | H04L 41/0806 |
| 2021/0397162 | A1* | 12/2021 | Johnston | G06Q 30/06 |
| 2022/0012256 | A1* | 1/2022 | Robertson | G06F 16/2358 |

FOREIGN PATENT DOCUMENTS

| | | | | |
|---|---|---|---|---|
| EP | 1443381 | A2 * | 8/2004 | G06F 21/121 |
| EP | 1653308 | | 5/2006 | |
| EP | 2506180 | A1 * | 10/2012 | G06F 21/105 |
| WO | WO-2008086373 | A2 * | 7/2008 | G06Q 10/06 |

OTHER PUBLICATIONS

Gemalto. "SafeNet ProtectToolkit C Administration Guide." (2016). Retrieved online Apr. 23, 2025. https://www.thalesdocs.com/gphsm/ptk/5.2/docs/PTK-C_Administration_Guide.pdf (Year: 2016).*

IBM. "Power Systems IBM i service functions." (2016). Retrieved online Apr. 23, 2025. https://www.ibm.com/docs/POWER6/areaj/areaj.pdf (Year: 2016).*

* cited by examiner

FIG 1
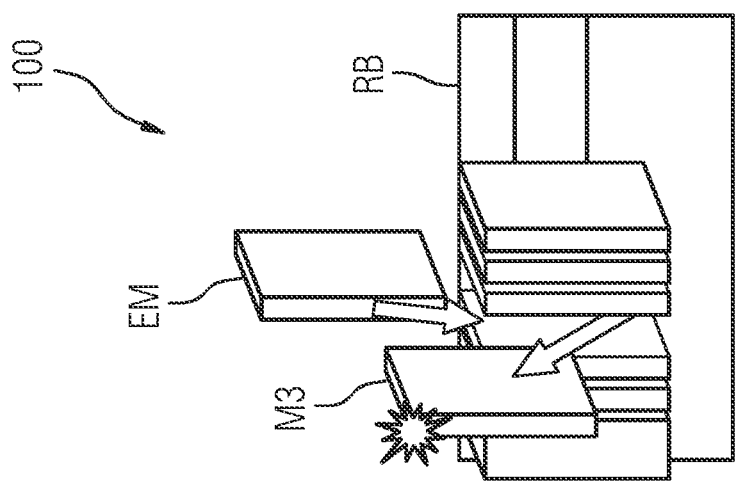
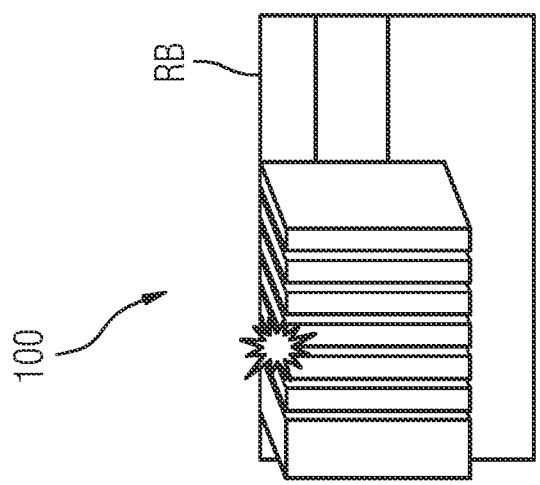
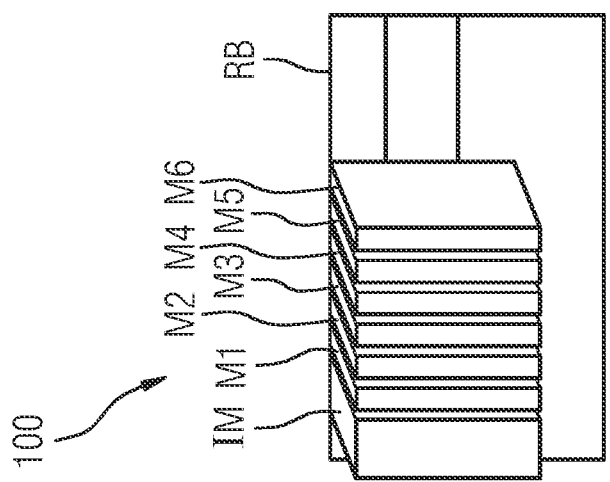

METHOD FOR RESTORING LICENSE KEYS IN A MODULAR AUTOMATION STATION, AUTOMATION STATION AND METHOD FOR OPERATING THE AUTOMATION STATION

BACKGROUND OF THE INVENTION

1. Field of the Invention

The invention relates to a method for restoring license keys in a modular automation station comprising a main unit with a backplane bus connection and a plurality of modules similarly with a backplane bus connection, where the modules or the main unit having a respective backplane bus connection communicate with one another via a backplane bus, where the modules are operated via a license key to provide software-based functionality tied to the respective license key, and where after a module is replaced with a replacement module, in which the software-based functionality is not yet enabled, a restoration step is performed.

The invention also relates to an automation station configured for modular construction from a main unit having a backplane connection and plurality of modules each similarly having a backplane bus connection, where the modules or the main unit with their respective backplane bus connection are arranged on a backplane bus, and where the modules are configured via a license key to provide a software-based functionality tied to the respective license key.

The invention also relates to an engineering station, which is structured to configure and parameterize an automation station with a main unit and modules, and which is configured to generate key data for license keys that enable software-based functionality of a module tied to the respective license key.

In accordance with the invention, a software-based functionality tied to the respective license key means the following:

With one and the same piece of software, different functions can be activated individually by different license keys. Basic functions can even be permitted without a license key at all.

With different function-related license keys, manufacturers can combine many functions in one product and, depending on customer requirements, also enable them gradually and progressively at a later point in time against payment.

If such license keys are used in the automation engineering, then in the event of a defective component independently of the IT infrastructure, in particular also in remote regions without an interrupt line, then the license keys for the replacement components are preferably automatically restored.

2. Description of the Related Art

In accordance with the current state of the art, the recovery process of a license key is either only possible with a continuously connected IT infrastructure or, for remote areas without IT infrastructure, only possible by a commissioning engineer manually connecting to the automation device via a programming device, for example a laptop, and resupplying the replacement component with the appropriate license key to restore functionality. However, this requires an experienced employee who has been instructed in the use of the tools.

SUMMARY OF THE INVENTION

It is an object of the invention to provide a method and an automation unit, which ensures that, following replacement of a defective automation component, a new automation component is automatically provided with a license key.

This and other objects and advantages is achieved in accordance with the invention by a method for restoring license keys by restoring a license key set, where the license key set comprises all license keys of the modules of the automation station, where for restoring the license key set, a first data block is read from a first storage location of the automation station, a second data block is read from a second storage location of the automation station, and a third data block is read from a third storage location of the automation station, where the data blocks comprise data portions of the license key set as follows, where the license key set is divided into a first part and a second part, where parity information is formed from the two parts and the data portions and the parity information are distributed in a balanced manner over the data blocks, and where the license key set is restored based on the parity information even when only two of the three data blocks are readable and the license key for the software-based functionality of the replaced module is assigned to the replacement module and thus the software-based functionality is enabled for the replacement module.

This method of restoring a license key not only creates an automated process that can be performed in remote areas, but also provides failure safety. This is because the storage pool of the first data block, second data block, and third data block not only saves and stores the data in a restorable manner, but by saving it with parity data, this method also provides failure safety because, for example, if a storage location is also in a component that needs to be replaced or is burned out, then the license keys can still be restored via the data blocks in the other two storage locations because of the distributed parity information.

In case of a new project being planned or an extension of the system, a corresponding set of license keys for the functionalities of the stations is still encoded and the corresponding data blocks with the parity data, which result in failure-safety, are generated and can be stored in different locations.

The objects and advantages in accordance with the invention by an automation station having a restorer that is configured, after a module has been replaced by a replacement module for which the software-based functionality has not yet been enabled, to recognize the replacement module without a valid license key and then to run through a restoration step, for which purpose a first storage location, a second storage location and a third storage location are arranged at different physical locations on or within the automation station, where the restorer is configured to restore a license key set that comprises all license keys of the modules from the automation station, where for restoring the license key set, the restorer is configured to read a first data block from the first storage location, a second data block from the second storage location, or a third data block from the third storage location, where the data blocks comprising data portions of the license key set as follows:

The license key set is divided into a first part with data portions and a second part with data portions, where parity information is formed from the two parts and the data portions and the parity information are distributed in a balanced manner over the data blocks, and where the license key set is restored based on the parity information even when only two of the three data blocks are readable and the license key for the software-based functionality of the replaced module restored from the license key set is assigned to the replacement module and thus the software-based functionality is enabled in the replacement module.

Advantageously, the automation station has a field bus interface that is configured for connection to a higher-level automation system or to an engineering station, where the main unit is configured to receive and store the license key set and/or the data blocks.

Automation stations are typically configured and parameterized via an engineering system or an engineering station. In order to be able to offer software-based behavior and functionality, the engineering system provides the assemblies or modules or the entire stations with license data in addition to the configuration data and the parameterization data. In order to keep a promise to provide simple replacement of assemblies, it is necessary that even in case of failure of one or a few assemblies, after replacement of the defective parts, the entire system will work again as it did originally. The license keys necessary for this are, as stated above, saved in a restorable manner.

Generation of license keys and encoding for an automation system occur via the engineering station in the configuration and/or reconfiguration of the system. All assemblies and licensed functionalities of the system are known to the tool or the engineering station. As a result, the key data can also be distributed across at least three data blocks in an optimum manner with parity data, here.

In order to achieve this, for the aforementioned method for the operation of an engineering station, a database is queried in the engineering station and from the database the information about the configuration and affiliation of the licensed functionalities to the modules is obtained, where a license key set is created with this information, where the license key set comprises all license keys of the modules of the automation station, where for a later restoration of the license key set in the automation station the license key set is divided into data portions, where the license key set is divided into a first part and a second part, where parity information is formed from the two parts and the data portions and the parity information is distributed in a balanced manner over a first data block, a second data block and a third data block, and where in a storage step, the first data block is written to a first storage location of the automation station, the second data block is written to a second storage location of the automation station and the third data block is written to a third storage location of the automation station.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the invention, in which:

FIG. 1 shows an exemplary exchange process at an automation station in accordance with the invention;

DETAILED DESCRIPTION OF THE EXEMPLARY EMBODIMENTS

FIG. 1 shows, from left to right, an automation station 100 structured for modular construction from a main unit IM having a backplane bus connection and a plurality of modules M1, . . . , M6, each similarly configured with a backplane bus connection. The modules M1, . . . , M6 or the main unit IM are arranged and configured to communicate via the backplane bus RB.

The main unit IM is also referred to as an interface module or as a PLC control system. For example, a first module M1 would be a first I/O module, a second module M2 would be a second I/O module, a third module M3 would be a third I/O module, and the fourth module M4 is also still an I/O module, but the fifth module M5 is an intelligent function module, and the sixth module M6 is a server module.

Such an automation station 100 with modules M1, . . . , M6 will be planned and put into operation via, for example, an engineering station or with a programming device. Many modules M1, . . . , M6 are defined by software, i.e., their functionality is, for example, dependent on a license key.

The middle image in FIG. 1 shows a module failing due to damage, such as a lightning strike. An error is indicated. An operator must arrange for a suitable spare part. The spare parts are, for example, located in a store to which the operator has access.

The right image in FIG. 1 shows the third module M3 being exchanged for a replacement module EM. The replacement module EM is not programmed, because it has come from the store and does not yet have a license key.

In accordance with the invention, the automation station 100 now runs a rebuild or restoration process, in which the license key is regenerated from parity information. Full functionality is then immediately available for the replacement module EM, which replaces the third module M3.

Figure 2:
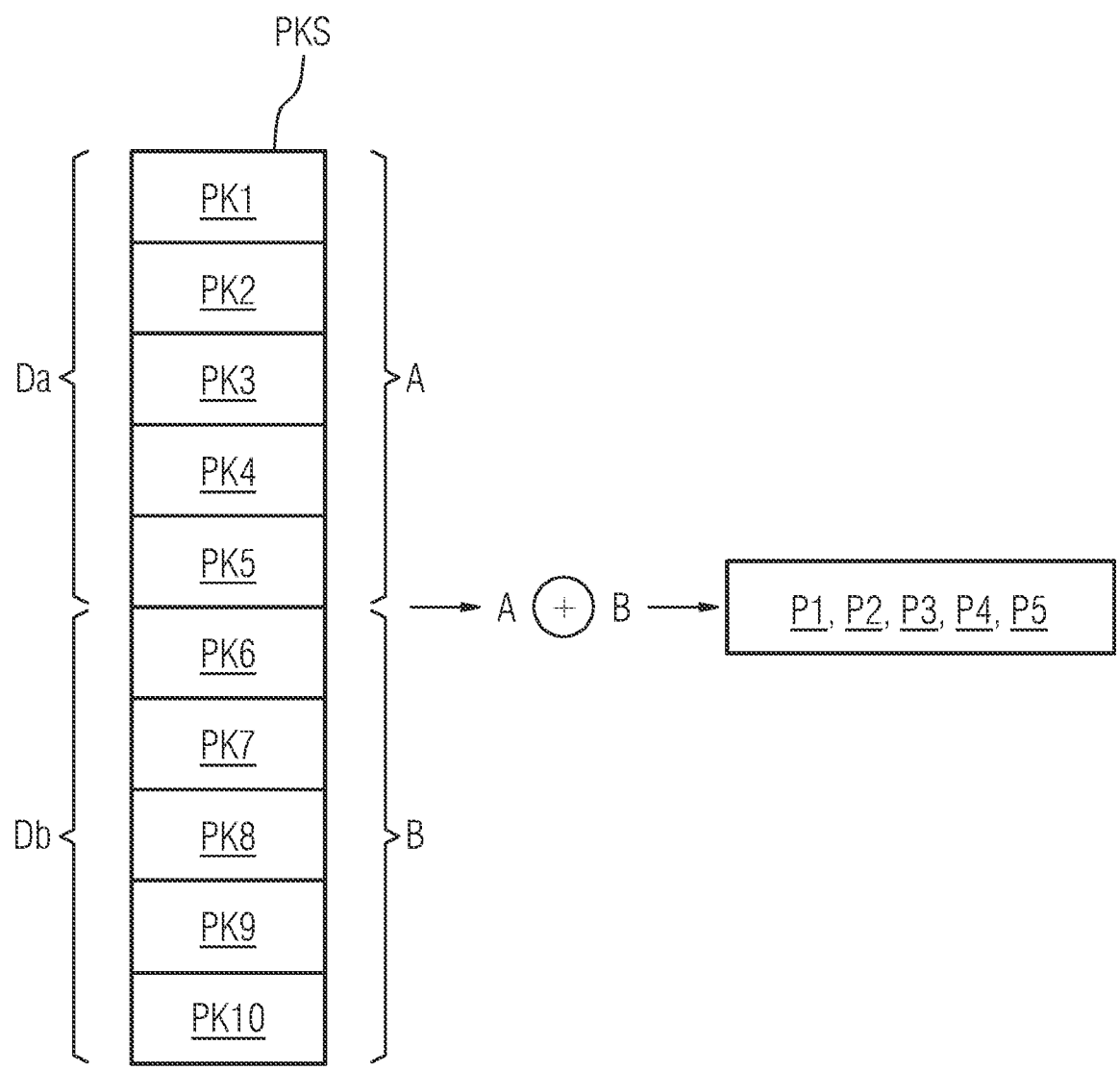
FIG. 2 shows the distribution of the license key set with the formation of parity information in accordance with the invention.

FIG. 2 demonstrates how priority information is generated from a dataset, i.e., a license key set PKS. The license key set PKS contains a number of licenses, i.e., from a first license key PK1 to a tenth license key PK10. The license key set PKS is split with license keys PK1, . . . , PK5 in a first part A and with license keys PK6, . . . , PK10 in a second part B. From the two parts A,B parity information P1,P2,P3,P4, P5 is generated via an X-OR operator.

Figure 3:
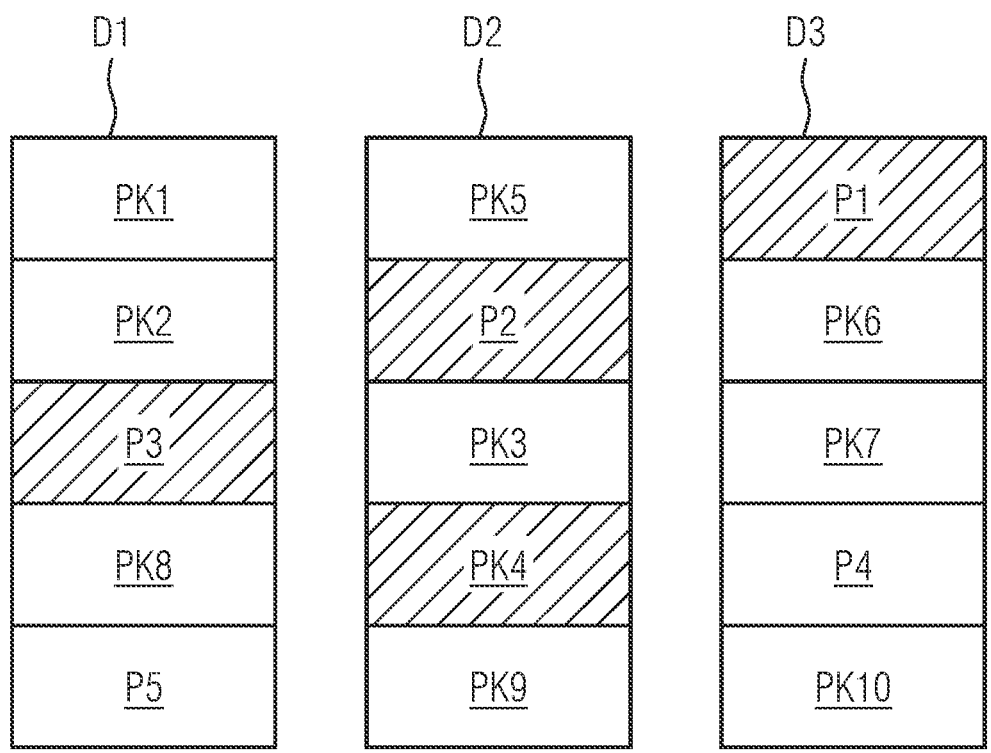
FIG. 3 shows a storage pool of three data blocks in accordance with the invention.

FIG. 3 shows the balanced distribution of the data portions Da,Db and the parity information P1,P2,P3,P4 across a first data block 1, a second data block 2 and a third data block 3.

Figure 4:
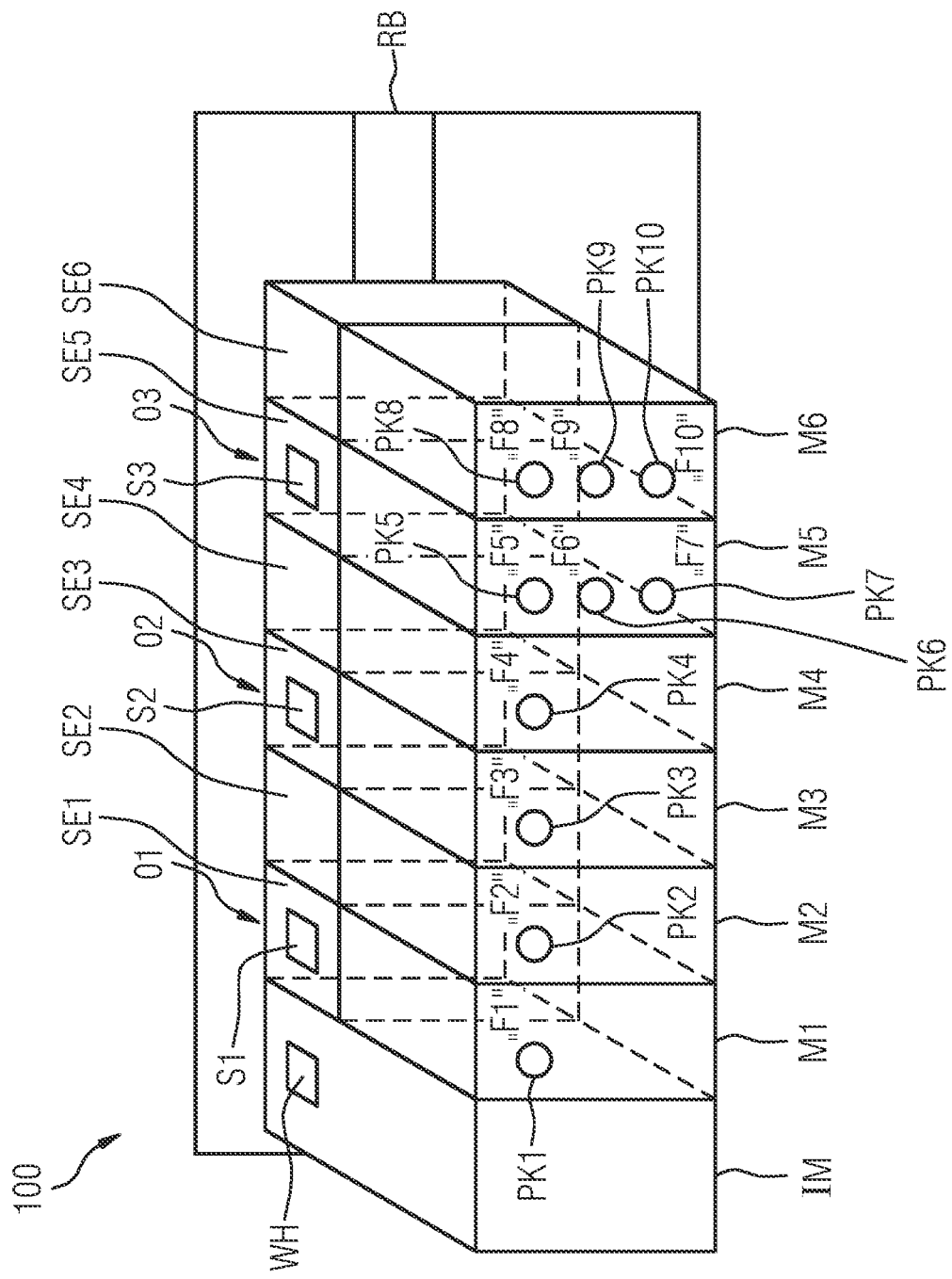
FIG. 4 shows an exemplary automation station with modular assemblies in accordance with the invention.

FIG. 4 is an exemplary automation system 100 having a main unit IM and six modules M1, . . . , M6. In this representation, the modules M1, . . . , M6 are arranged in socket units SE1, ..., SE6. Such socket units SE1, ..., SE6 are also referred to as terminal units, into which modules can be plugged.

The main unit IM has a restorer WH, which is configured, following a replacement of a module M3 (see FIG. 1) by a replacement module EM, to restore the license for this replacement module EM.

Using an engineering station 201 (see FIG. 4), the following configurations were assigned to the automation station 100. The first module M1 receives a functionality F1 with the first license key PK1, the second module M2 receives a functionality F2 with the second license key PK2, the third module M3 receives a functionality F3 with the third license key PK3, and the fourth module M4 receives a fourth functionality F4 with the fourth license key PK4. The modules M1, ..., M4 are similar I/O modules. Consequently, only one license key PK1,PK2,PK3 is necessary in each case for their functionality. Modules M5 and M7 are smart function modules or server modules, requiring a number of license keys. For this purpose, the fifth module M5, as a smart function module, has a fifth license key PK5 for a fifth functionality, a sixth license key PK6 for a sixth functionality, and a seventh license key PK7 for a seventh functionality. Similarly, the sixth module M6, as a server module, requires three additional license keys PK8,PK9, PK10, which accordingly provide an eighth functionality F8, a ninth functionality F9 and a tenth functionality F10.

In order to also provide failure safety, the three data blocks 1,2,3 are stored at different locations O1,O2,O3 in the automation system 100. With socket unit SE1, the first automation module M1 provides a first location O1 for storage in the first storage location S1. The third module M3 provides a second location E2 for a second storage location S2 for the second data block 2 with its third socket unit SE3, and the fifth module M5 provides a third location O3 for a third storage location S3 for the third data block 3 with its fifth socket unit SE5. If the first module M1 and also its socket unit SE1 are destroyed by lightning, then the entire license key set PKS can be restored via the restorer WH based on the parity information from the second data block 2 in the second storage location S2 and the third data block 3 in the third storage location S3, and the first license key PK1 for the first function F1 for the replacement module EM can be restored from the license key set PKS.

Figure 5:
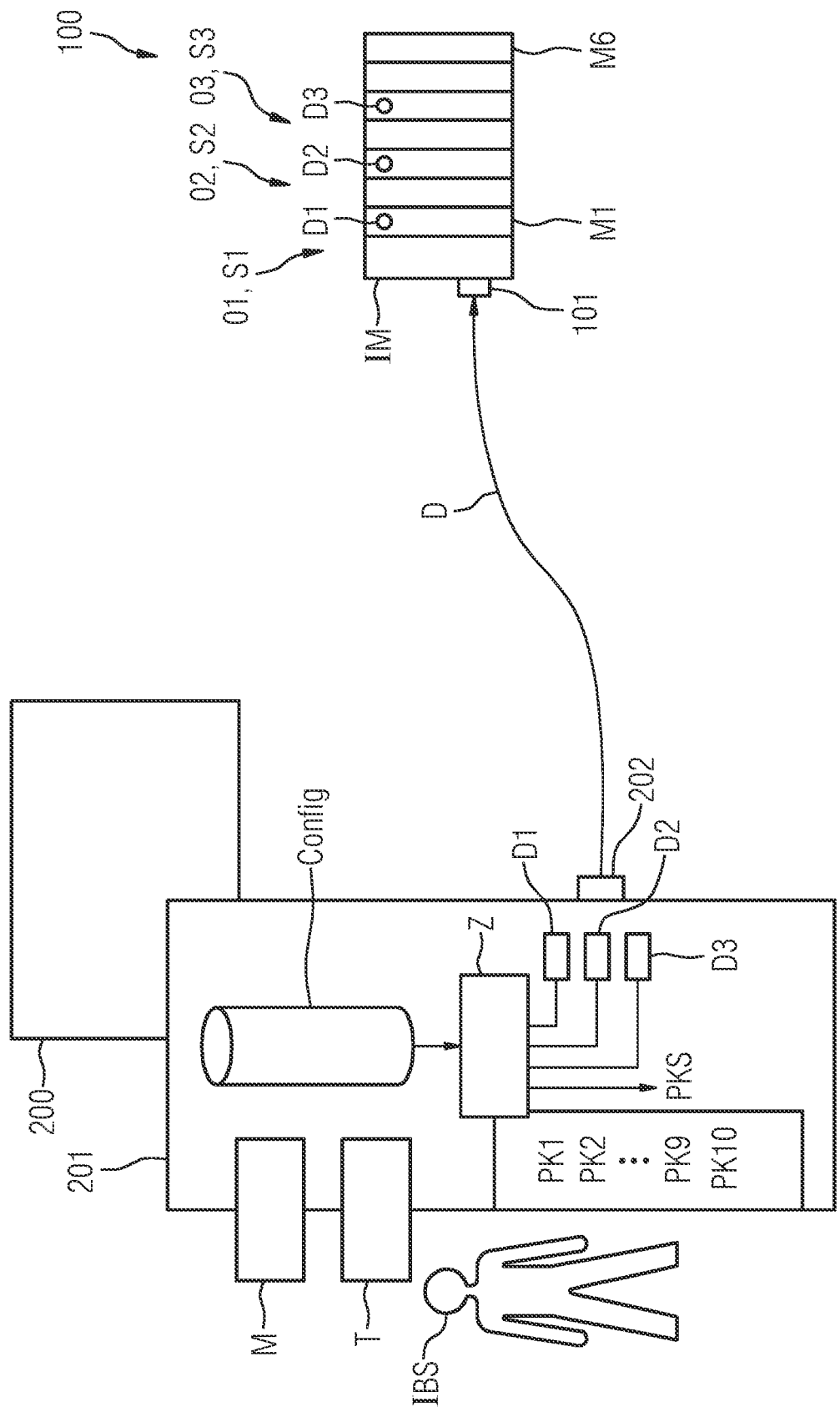
FIG. 5 shows an engineering station for providing license keys and data blocks in accordance with the invention.

FIG. 5 shows the aforementioned engineering station 201, which is structured to configure and parameterize the automation station 100 with the main unit IM and the modules M1, ..., M6. A keyboard T and a monitor M are available to a commissioning engineer IBS at the engineering station 201 for configuration. In addition, the engineering station 201 is configured to generate key data for the license key PK1, ..., PK10. The license keys PK1, ..., PK10 ensure that a software-based functionality F1, ..., F10 is enabled on the modules M1, ..., M6.

In the engineering station 201, a database Config is queried via an assigner Z and from the database Config the information about the configuration and the affiliation of the licensed functionalities F1, ..., F10 to the modules M1, ..., M6 is obtained. With this information, a license key set PKS is provided. The license key set PKS contains all license keys PK1, ..., PK10 of the modules M1, ..., M6 of the automation station 100. For later recovery of the license key set PKS in the automation station 100, the license key set PKS is broken down into data portions Da,Db, and thereby the license key set PKS is broken down into a first part A and a second part B, where parity information P1,P2,P3,P4 is formed from the two parts A,B.

The data portions Da,Db and the parity information P1,P2, P3,P4 are given a balanced distribution among a first data block 1, a second data block 2 and a third data block 3.

In a storage step D or a download process, the first data block 1 is written to a first storage location S1 of the automation station 100. The second data block 2 is written to a second storage location S2 and the third data block 3 is written to a third storage location S3.

Figure 6:
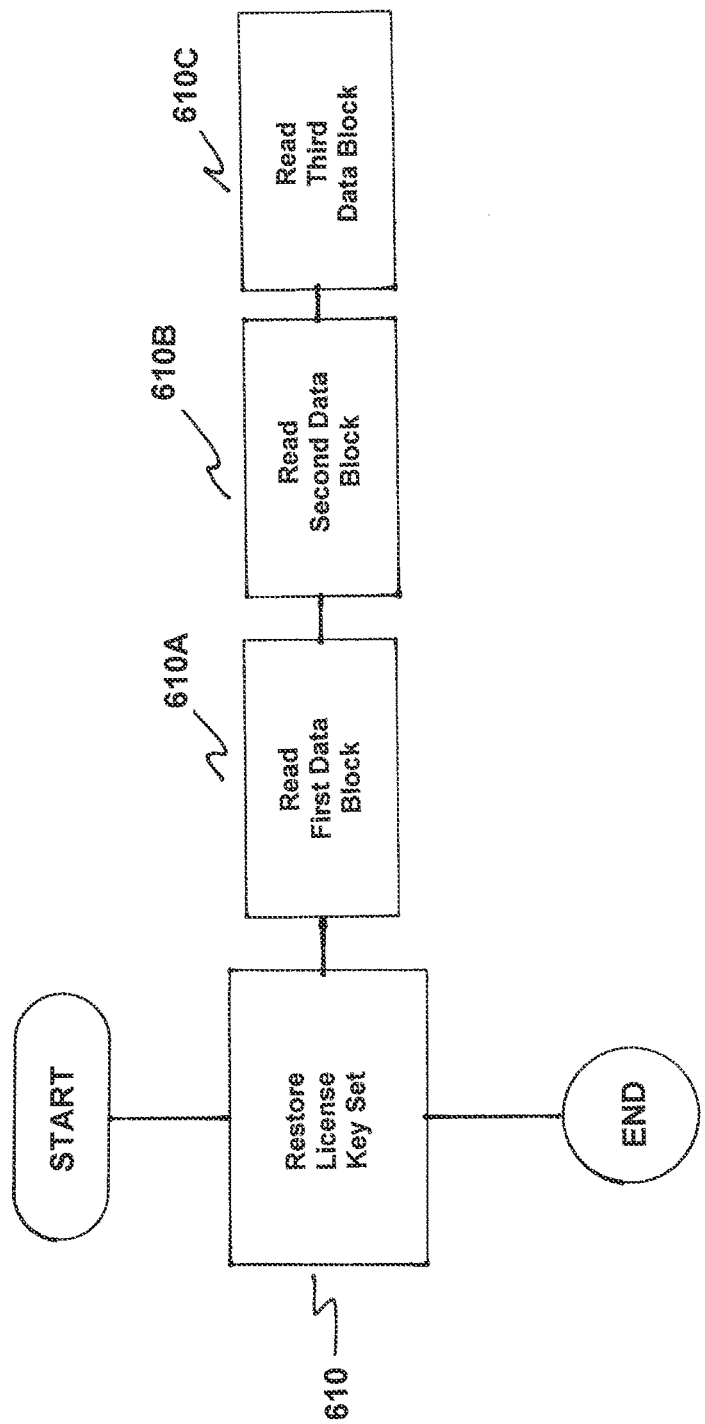
FIG. 6 is a flowchart of the method for restoring license keys in a modular automation station in accordance with the invention.

FIG. 6 is a flowchart of the method for restoring license keys PK1, ..., PK10 in a modular automation station 100 comprising a main unit IM having a backplane bus connection and a plurality of modules M1, ..., M6 having another backplane bus connection, where the plurality of modules M1, ..., M6 or the main unit IM with a respective backplane bus connection communicate with one another via a backplane bus RB, the plurality of modules M1, ..., M6 is operated via a license key PK1, ..., PK10 to provide a software-based functionality F1, ..., F10 tied to a respective license key PK1, ..., PK10, and after a module M3 is replaced with a replacement module EM, in which the software-based functionality F3 is not yet enabled, a restoration step is performed.

The method comprises restoring a license key set PKS, as indicated in step 610. Here, the license key set PKS comprises all license keys PK1, ..., PK10 of the plurality of modules M1, ..., M6 of the automation station 100.

In accordance with the method, the restoration of the license key set PKS comprises reading a first data block 1 from a first storage location S1 of the automation station 100, as indicated is step 610A.

Next, a second data block 2 is read from a second storage location S1 of the automation station 100, as indicated in step 610B.

Next, a third data block 3 is read from a third storage location S1 of the automation station 100, as indicated in step 610C.

In accordance with the method the first, second and third data blocks 1,2,3 comprise data portions Da,Db of the license key set PKS as follows, where the license key set PKS is divided into a first part A and a second part B. In addition, parity information P1,P2,P3,P4 is formed from the first and second parts A,B and the data portions Da,Db and the parity information P1,P2,P3,P4 are distributed in a balanced manner over the first, second and third data blocks 1,2,3. Further, the license key set PKS is restored based on the parity information even when only data blocks of the first, second and third data blocks 1,2,3 are readable and the license key PK3 for the software-based functionality F3 of the replaced module M3 is assigned to the replacement module EM and thus the software-based functionality F1 is enabled for the replacement module EM.

Figure 7:
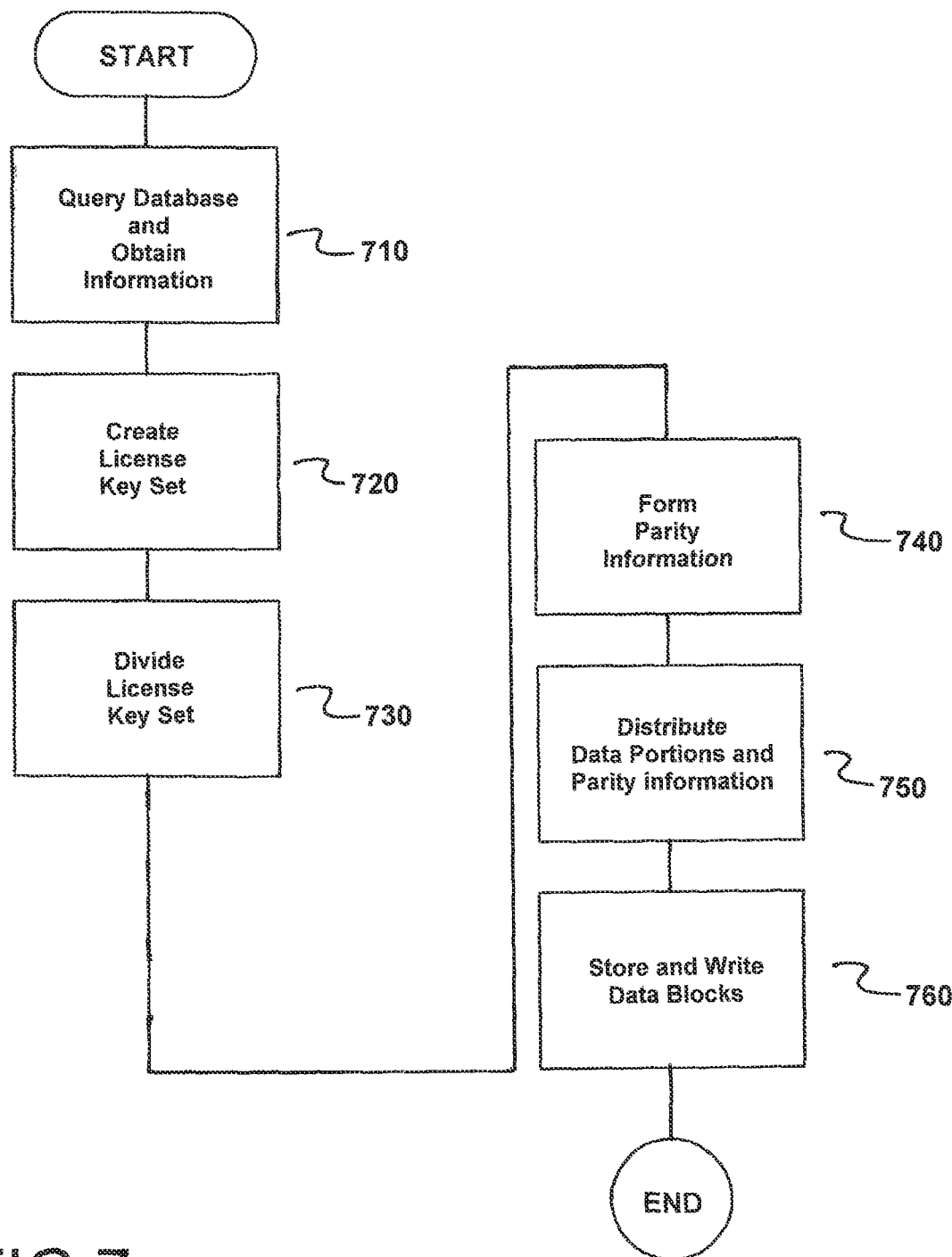
FIG. 7 is a flowchart of the method for operating an engineering station in accordance with the invention.

FIG. 7 is a flowchart of the method for operating an engineering station 201 that is structured to configure and parameterize an automation station 100 having a main unit IM and modules M1, ..., M6 and which is configured to generate key data for license keys PK1, ..., PK10 that enable software-based functionality F1, ..., F10 of a module M1, ..., M6 tied to the respective license key PK1, ..., PK10.

The method comprises querying a database Config in the engineering station 201 and obtaining information about a configuration and affiliation of licensed functionalities F1, ..., F10 to the modules M1, ..., M6 from the database Config, as indicated in step 710.

Next, a license key set PKS is created from the information, as indicated in step 720. In accordance with the method, the license key set PKS comprises all license keys PK1, . . . , PK10 of the modules M1, . . . , M6 of the automation station 100.

Next, the license key set PKS is divided into data portions Da,Db for subsequent restoration of the license key set PKS in the automation station 100, as indicated in step 730. Here, the license key set PKS is divided into a first part A and a second part B.

Next, parity information P1,P2,P3,P4 is formed from the first and second parts A,B, as indicated in step 740.

Next, the data portions Da,Db and the parity information P1,P2,P3,P4 are distributed in a balanced manner over a first data block 1, a second data block 2 and a third data block 3, as indicated in step 750.

Next, the first, second and third data blocks 1, 2, 3 are stored D by writing the first data block 1 to a first storage location S1 of the automation station 100, writing the second data block 2 to a second storage location S2 of the automation station 100 and writing the third data block 3 to a third storage location S3 of the automation station 100, as indicated in step 760.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for restoring license keys in a modular automation station comprising a main unit having a backplane bus connection, a field bus interface configured to connect to a higher-level automation system or an engineering station and comprising a plurality of modules having another backplane bus connection, the plurality of modules or the main unit with a respective backplane bus connection communicating with one another via a backplane bus, the plurality of modules being operated via a license key to provide a software-based functionality tied to a respective license key, and after a module is replaced with a replacement module, in which the software-based functionality is not yet enabled, a restoration step being performed, the method comprising:

restoring a license key set, the license key set comprising all license keys of the plurality of modules of the automation station, said restoring the license key set comprising:
        reading a first data block from a first storage location of the automation station;
        reading a second data block from a second storage location of the automation station; and
        reading a third data block from a third storage location of the automation station;

wherein the first, second and third data blocks comprise data portions of the license key set as follows, the license key set being divided into a first part and a second part;
    wherein parity information is formed from the first and second parts and the data portions and the parity information are distributed in a balanced manner over the first, second and third data blocks;
    wherein the license key set is restored based on the parity information even when only data blocks of the first, second and third data blocks are readable and the license key for the software-based functionality of the replaced module is assigned to the replacement module and thus the software-based functionality is enabled for the replacement module; and
    wherein the main unit is configured to receive and store at least one of the license key set and the first, second and third data blocks.

2. An automation station structured for modular construction from a main unit having a backplane bus connection and a plurality of modules each having another backplane bus connection, the plurality of modules or the main unit each being provided with a respective backplane bus connection, the plurality of modules being configured via a license key to provide a software-based functionality tied to the respective license key, the automation station comprising:

a restorer which is configured, after a module has been replaced by a replacement module, for which the software-based functionality has not yet been enabled, to recognize the replacement module without a valid license key and to subsequently run through a restoration step, a first storage location, a second storage location and a third storage location being arranged at different physical locations on or within the automation station; and
    a field bus interface configured to connect to a higher-level automation system or an engineering station;
    wherein the restorer is configured to restore a license key set;
    wherein the license key set comprises all license keys of the modules of the automation station;
    wherein to restore the license key set the restorer being further configured to read one of (i) a first data block from the first storage location, (ii) a second data block from the second storage location and (iii) a third data block from the third storage location;
    wherein the first second and third data blocks comprise data portions of the license key set as follows: the license key set is divided into a first part and a second part;
    wherein parity information is formed from the first and second parts and the data portions and the parity information are distributed in a balanced manner over the first, second and third data blocks;
    wherein the license key set is restored based on the parity information even when only two data blocks of the first, second and third data blocks are readable and the license key for the software-based functionality of the replaced module retrieved from the license key set is assigned to the replacement module and thus the software-based functionality is enabled in the replacement module; and
    wherein the main unit is configured to receive and store at least one of the license key set and the first, second and third data blocks.

3. A method for operating an engineering station which is structured to configure and parameterize an automation station having a main unit, a field bus interface configured to connect to a higher-level automation system or the engineering station, and having modules, the engineering station being further structured and configured to generate key data for license keys which enable software-based functionality of a module tied to the respective license key, the method comprising:

- querying a database in the engineering station and obtaining information about a configuration and affiliation of licensed functionalities to the modules from the database;
- creating a license key set from said information, the license key set comprising all license keys of the modules of the automation station;
- dividing the license key set into data portions for subsequent restoration of the license key set in the automation station, the license key set being divided into a first part and a second part;
- forming parity information from the first and second parts;
- distributing the data portions and the parity information in a balanced manner over a first data block, a second data block and a third data block; and
- storing the first, second and third data blocks by writing the first data block to a first storage location of the automation station, writing the second data block to a second storage location of the automation station and writing the third data block to a third storage location of the automation station;
- wherein the main unit is configured to receive and store at least one of the license key set and the first, second and third data blocks.

* * * * *